US012491203B2

(12) United States Patent
Alberini et al.

(10) Patent No.: US 12,491,203 B2
(45) Date of Patent: Dec. 9, 2025

(54) USE OF MANNOSE 6 PHOSPHATE AND MODIFICATIONS THEREOF FOR MEMORY ENHANCEMENT AND REDUCING MEMORY IMPAIRMENT

(71) Applicant: New York University, New York, NY (US)

(72) Inventors: Cristina Maria Alberini, New York, NY (US); Dirk Trauner, New York, NY (US); Christopher James Arp, The Woodlands, TX (US)

(73) Assignee: New York University, New York, NY (US)

( * ) Notice: Subject to any disclaimer, the term of this patent is extended or adjusted under 35 U.S.C. 154(b) by 893 days.

(21) Appl. No.: 17/267,721

(22) PCT Filed: Aug. 12, 2019

(86) PCT No.: PCT/US2019/046228

§ 371 (c)(1),
(2) Date: Feb. 10, 2021

(87) PCT Pub. No.: WO2020/033972

PCT Pub. Date: Feb. 13, 2020

(65) Prior Publication Data

US 2021/0322451 A1 Oct. 21, 2021

Related U.S. Application Data

(60) Provisional application No. 62/871,453, filed on Jul. 8, 2019, provisional application No. 62/717,405, filed on Aug. 10, 2018.

(51) Int. Cl.
*A61K 31/7028* (2006.01)
*A61P 25/28* (2006.01)

(52) U.S. Cl.
CPC .......... *A61K 31/7028* (2013.01); *A61P 25/28* (2018.01)

(58) Field of Classification Search
CPC .............. A61K 31/7028; A61K 9/0019; A61K 31/661; A61K 47/26; A61P 25/23; A61P 25/26
USPC .......................................................... 514/25
See application file for complete search history.

(56) References Cited

U.S. PATENT DOCUMENTS

| | | | |
|---|---|---|---|
| 6,093,388 | A | 7/2000 | Ferguson |
| 6,140,307 | A | 10/2000 | Ferguson et al. |
| 6,294,521 | B1 | 9/2001 | Cowden |
| 8,293,875 | B2 | 10/2012 | Hassan et al. |
| 8,551,960 | B2 | 10/2013 | Montero et al. |
| 2005/0256059 | A1 | 11/2005 | Benowitz |
| 2010/0081613 | A1 | 4/2010 | Arancio et al. |
| 2012/0009245 | A1 | 1/2012 | Bankiewicz |
| 2012/0045455 | A1 | 2/2012 | Robertson et al. |
| 2012/0093795 | A1 | 4/2012 | Garcia et al. |
| 2012/0266263 | A1 | 10/2012 | Alberini et al. |
| 2014/0056867 | A1 | 2/2014 | Lebowitz et al. |
| 2014/0187430 | A1 | 7/2014 | Hu |
| 2015/0224164 | A1 | 8/2015 | Glass et al. |
| 2021/0315914 | A1 | 10/2021 | Alberini et al. |

FOREIGN PATENT DOCUMENTS

| | | | | |
|---|---|---|---|---|
| CN | 1660125 A | 8/2005 | | |
| TW | 200833711 A | 8/2008 | | |
| WO | 9001938 A1 | 3/1990 | | |
| WO | 2004028468 A2 | 4/2004 | | |
| WO | 2011000958 A1 | 1/2011 | | |
| WO | WO 2011/033305 A1 * | 3/2011 | ......... | A61K 31/7024 |
| WO | 2013119964 A2 | 8/2013 | | |
| WO | 2014085480 A1 | 6/2014 | | |

OTHER PUBLICATIONS

Wang et al, Mol Neurobiol 2017, 54, 2636-2658.*
Jeanjean et al, Bioorganic & Medicinal Chemistry, 2006, 14, 3575-3582.*
Vidil et al, Eur J Org Chem, 1999, 447-450.*
Wang, Y., et al., Insulin-Like Growth Factor-II/Cation-Independent Mannose 6-Phosphate Receptor in Neurodegenerative Diseases, Molecular Neurobiology, Mar. 19, 2016, vol. 54, pp. 2636-2658.
Ren, W., et al., Peripheral Nerve Injury Leads to Working Memory Deficits and Dysfunction of the Hippocampus by Upregulation of TNF-alpha in Rodents, Neuropsychopharmacology, Feb. 2, 2011, vol. 36, pp. 979-992.
Jeanjean, A., et al., Synthesis and receptor binding affinity of carboxylate analogues of the mannose 6-phosphate recognition marker, Bioorganic & Medicinal Chemistry, 2006, vol. 14, pp. 3575-3582.
Vidal, S., et al., "Synthesis and biological evaluation of new mannose 6-phosphate analogues," BioOrganic & Medicinal Chemistry, Dec. 2002, vol. 10, Issue 12, pp. 4051-4056.
Sun, M., et al., "Interactions between the recombinant human CREG protein and cathepsins and M6P/IGFIIR," Chinese Journal of Tissue Engineering Research, Sep. 10, 2015, vol. 19, No. 37, pp. 5961-5965.
Cruz, E., et al., "CIM6P/IGF-2 Receptor Ligands Reverse Deficits in Angelman Syndrome Model Mice, Autism Research," Jan. 2021, vol. 14, No. 1, pp. 29-45.
Barragan-Montero, V. et al., "Synthesis of Mannose-6-Phosphate Analogues and their Utility as Angiogenesis Regulators," ChemMedChem Communications, Jul. 26, 2011, vol. 6, No. 10, pp. 1771-1774.
Clavel, C., et al., "Synthesis and biological activity of M6-P and M6-P analogs on fibroblast and keratinocyte proliferation," IL Farmaco, Sep. 2005, vol. 60, No. 9, pp. 721-725.
Pubchem-CID: 67160412, "2-[(2R,3S,4S,5S)-3,4,5-Trihydroxy-6-methoxyoxan-2-yl]ethylphosphonic acid," Nov. 30, 2012, pp. 1-7.

(Continued)

*Primary Examiner* — Ganapathy Krishnan
(74) *Attorney, Agent, or Firm* — Hodgson Russ LLP

(57) ABSTRACT

Provided are compositions and methods for memory enhancement, including recovery of memory impairment. The compositions and methods relate to mannose-6-phosphate and derivatives of mannose-6-phosphate. The methods relate to administration of M6P or derivatives thereof to individuals in whom memory enhancement is desired.

15 Claims, 6 Drawing Sheets

(56) References Cited

OTHER PUBLICATIONS

Steinmetz, A.B., et al., "Insulin-Like Growth Factor II Targets the mTOR Pathway to Reverse Autism-Like Phenotypes in Mice," The Journal of Neuroscience, Jan. 24, 2018, vol. 38, No. 4, pp. 1015-1029.

Stern, S.A., et al., "Systemic IGF-II treatment enhances memories and rescues autistic phenotypes," Society for Neuroscience, Nov. 11, 2013.

Stern, S.A., et al., "Memory enhancing effects of IGF-II and its role in social interaction in a mouse model of autism," Society for Neuroscience, Oct. 14, 2012.

Sun, J., et al., "mTORC1-S6K1 inhibition or mTORC2 activation improves hippocampal synaptic plasticity and learning in Angelman syndrome mice," Cellular and Molecular Life Sciences, May 12, 2016, vol. 73, pp. 4303-4314.

Qiu et al., "Imprinted Angel—Angelman syndrome and Ube3a gene," The Mystery of the Brain, Aug. 31, 2017, pp. 131-136.

Lina et al., "Analysis of genomic copy number variation in 55 children with mental retardation/developmental delay using microarray comparative genomic hybridization," The Chinese Journal of Child Health Care, Aug. 31, 2014, vol. 22, Issue 8, pp. 795-798.

Murphy et al., "Imprinted Genes as Potential Genetic and Epigenetic Toxicologic Targets," Environmental Health Perspectives, Mar. 1, 2000, vol. 108, Supplement 1.

Gary-Bobo, M., et al., "Mannose 6-Phosphate Receptor Targeting and its Applications in Human Diseases," Current Medicinal Chemistry, 2007, vol. 14, No. 28, pp. 2945-2953.

* cited by examiner

USE OF MANNOSE 6 PHOSPHATE AND MODIFICATIONS THEREOF FOR MEMORY ENHANCEMENT AND REDUCING MEMORY IMPAIRMENT

CROSS REFERENCE TO RELATED APPLICATIONS

This application claims priority to U.S. Provisional application No. 62/717,405, filed on Aug. 10, 2018, and to U.S. Provisional application No. 62/871,453, filed on Jul. 8, 2019, the disclosures of which are incorporated herein by reference.

STATEMENT REGARDING FEDERALLY SPONSORED RESEARCH OR DEVELOPMENT

This invention was made with government support under grant numbers MH065635 and MH074736 awarded by the National Institutes of Health. The government has certain rights in the invention.

BACKGROUND OF THE INVENTION

Memory enhancement may be desirable under pathogenic situations where memory retention and recall have been adversely affected as well under non-pathological situations. Examples of diseases where memory loss can occur include neurodegenerative diseases, mild cognitive impairments, cerebrovascular diseases, Lewy body disease, frontotemporal degeneration, developmental cognitive disorders, traumatic brain injury, delirium, infections, alcohol abuse or cancer. In the absence of effective means for memory enhancement, there continues to be a need for development of approaches for enhancement of memory.

SUMMARY OF THE DISCLOSURE

This disclosure provides a method for memory enhancement and recovery of memory impairments. The method comprises administering to a subject in whom memory enhancement or recovery of memory impairment is desired, or a subject seeking memory enhancement or recovery of memory impairment, a composition comprising, or consisting essentially of, a therapeutically effect amount of an agonist or activator of IGF-2 receptor other than IGF-2. In an embodiment, the agonist is mannose-6-phosphate (M6P) or a derivative of mannose-6-phosphate (also referred to herein as "modifications"), or a derivative or modification of IGF-2 (e.g., IGF-2 analogs). In an embodiment, a composition comprising, or consisting essentially of, M6P or M6P derivatives may be used for treatment of any neurodegenerative diseases in which there is protein aggregation (leading to synaptopathies), including diseases such as Alzheimer's disease, Parkinson's disease, Lewy body disease and the like. In an embodiment, a composition comprising, or consisting essentially of, M6P or derivatives of M6P may be used for reducing memory impairment. In an embodiment, IGF-2 modifications (e.g., IGF-2 analogs) may be used for enhancement of memory or reducing memory impairment.

DESCRIPTION OF THE DISCLOSURE

Figure 1:
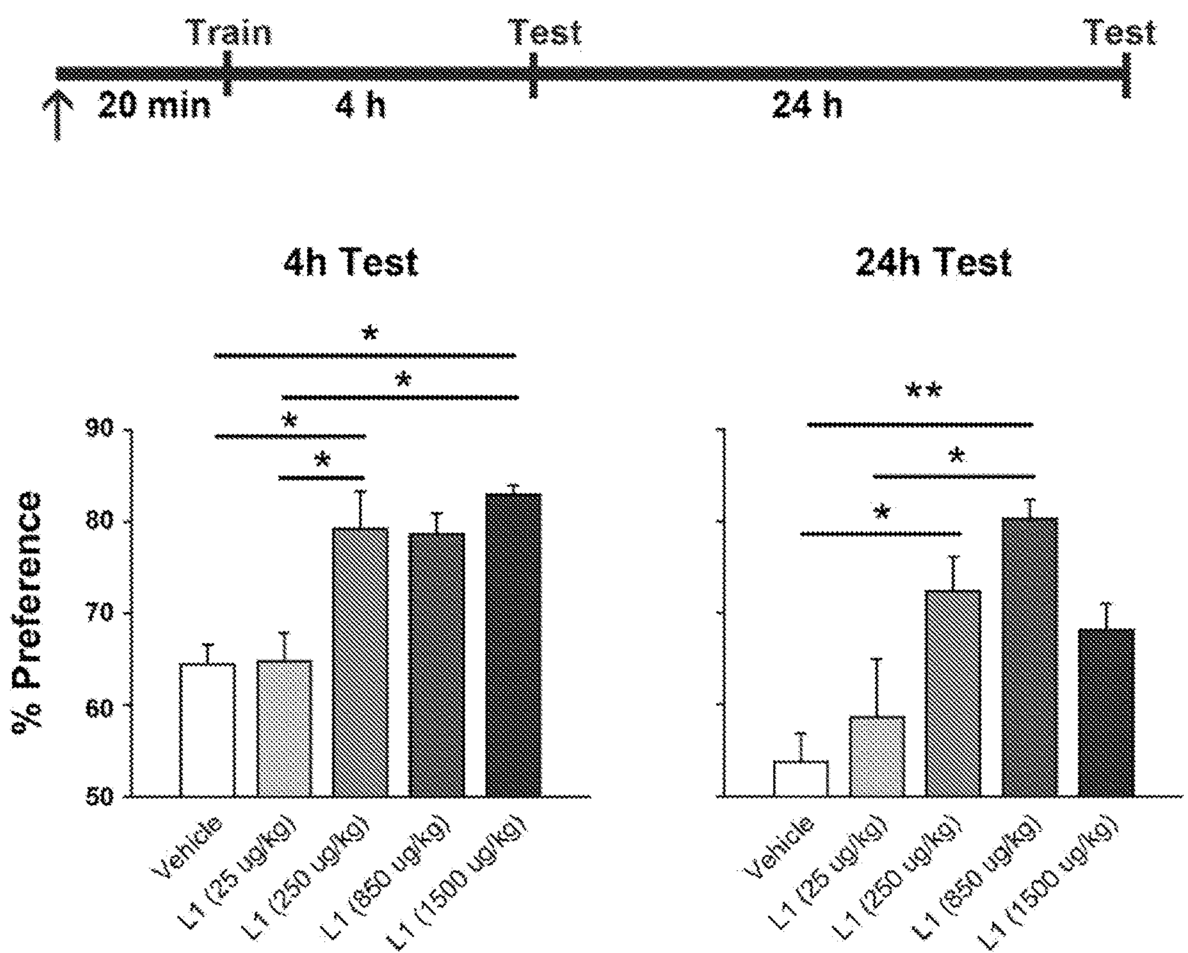
FIG. 1. Dose-response curve of the effect of M6P, also called IGF2R.L1 (L1) on nOR in normal (wild type, WT) mice. Experimental timeline is shown above graphs. Data are expressed as the mean±s.e.m. N=4 per group. One-way analysis of variance (ANOVA) followed by Bonferroni post-hoc tests. *P<0.05, **P<0.01. WT mice were injected s.c. with vehicle solution or different doses of IGF2R.L1 (L1) 20 min prior to training on nOR. Graphs show percent exploration preference for the novel object compared to the familiar object at testing performed at 4 h and 24 h after training.

This disclosure provides compositions and methods for memory enhancement or treatment of memory impairment using agonist activators of IGF-2 receptor other than IGF-2. For example, M6P or a derivative thereof may be used.

The term "treatment" as used herein refers to reduction or delay in one or more symptoms or features associated with the presence of the particular condition being treated Treatment does not mean complete cure. Treatment in reference to memory enhancement means increased memory retention, increased memory strength, and/or reduced memory decay.

The term "therapeutically effective amount" as used herein is the amount sufficient to achieve, in a single or multiple doses, the intended purpose of treatment. For example, an effective amount to achieve memory enhancement is an amount sufficient to achieve a measurable increase in memory (which may be tested by e.g., standard tests that can test learning and memory performance). The exact amount desired or required will vary depending on the mode of administration, patient specifics and the like. Appropriate effective amounts can be determined by one of ordinary skill in the art (such as a clinician) with the benefit of the present disclosure.

The term "memory loss" as used herein, refers to a complete or partial loss of memory.

The term "memory retention" is a measure of memory strength. Therefore, "enhancing memory strength" can be measured by a subject's ability to retain a particular memory.

The term "short-term memory" as used herein is a memory that lasts for seconds or several minutes.

The term "working memory" as used herein refers to a memory that is responsible for temporarily holding information available for processing. Working memory is important for reasoning and the guidance of decision-making and behavior.

The term "long-term memory" as used herein, refers to a memory that can last at least for several hours, at least a day, at least a year, at least a decade, or a lifetime.

Where a range of values is provided in this disclosure, it should be understood that each intervening value, to the tenth of the unit of the lower limit between the upper and lower limit of that range, and any other intervening value in that stated range is encompassed within the invention, unless clearly indicated otherwise. The upper and lower limits of these smaller ranges may independently be included in the smaller ranges encompassed within the disclosure.

As used in this disclosure, the singular forms include the plural forms and vice versa unless the context clearly indicates otherwise.

This disclosure describes the effects of M6P and M6P derivatives on memory enhancement. In one aspect, this disclosure provides a method of enhancement of memory comprising administering to a subject in need of treatment or in whom memory enhancement is desired (such as an individual seeking memory enhancement), a composition comprising, or consisting essentially of, M6P or a modification thereof. Phosphonate and sulfonate derivatives of M6P are known in the art (U.S. Pat. No. 6,140,307 to Ferguson, the description of which modifications is incorporated herein by reference). Memory enhancement can be in the form of memory recall and retention (short or long term) and/or memory strength. In an embodiment, IGF-2 modifications (e.g., IGF-2 analogs) may be used. For example, IGF-2 with amino acid substitutions such as human Leu 27 (Armitaj et al., Neuroscience, 2010 Oct. 27; 170(3):722-30) may be used.

The molecules (also referred to herein as agents) of the present disclosure include M6P (referred to herein as L1). Derivatives of M6P (also referred to herein as modifications) can be made by modifications to carbon 1 and/or carbon 6 of mannose. Methods of performing chemistry at carbon 1 and carbon 6 are known in the art. Examples of derivatives include examples where carbon 1 is functionalized with an alkoxy group (e.g., methoxy, ethoxy, and the like) or an alkyne and carbon 6 is functionalized with a phosphonate, an ethyl ester, a methyl malonate, a phosphonic acid, a carboxylate, or a malonate. In various examples, carbon 1 is functionalized with an alkoxy (e.g., a methoxy) and carbon 6 is functionalized with a phosphonate (referred to herein as L2), an ethyl ester (referred to herein as L3), a methyl malonate (referred to herein as L4), a phosphonic acid (referred to herein as L5), a carboxylate (e.g., the sodium salt of a carboxylate) (referred to herein as L6), or a malonate (referred to herein as L7) and carbon 1 is functionalized with alkyne and carbon 6 is functionalized with a phosphonic acid (referred to as L8) or a phosphonate (referred to as L9). The structures for M6P and its derivatives listed above are shown below:

L1

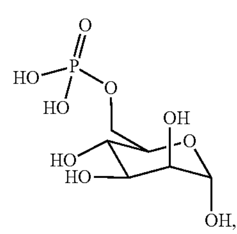

-continued

L2

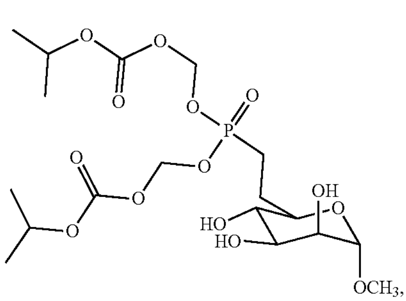

L3

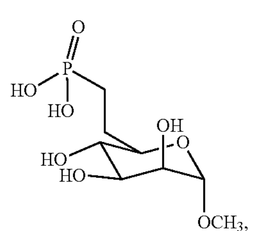

L4

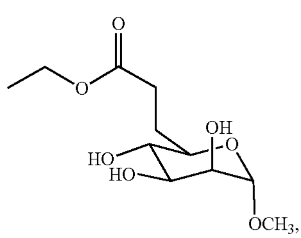

L5

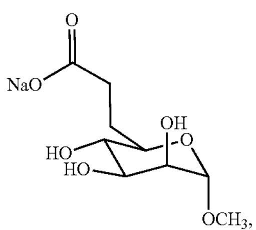

L6

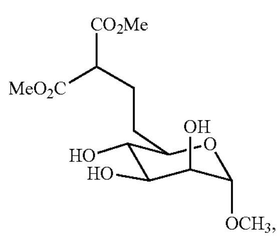

L7

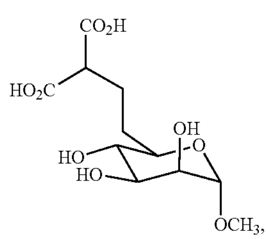

-continued

L8

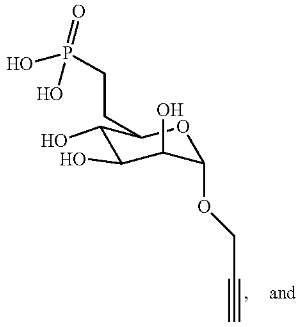

L9

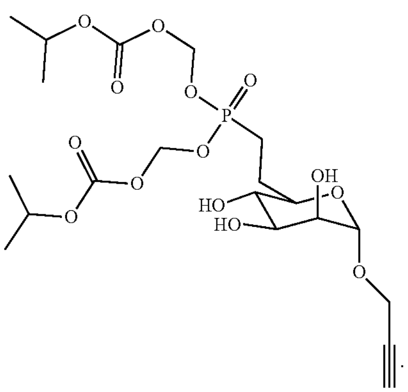

Formulations, doses and uses of M6P as described herein also applicable to any of the modifications (derivatives). M6P or M6P derivatives may be used at from about 1 to 2,000 μg/kg body weight and all values and ranges therebetween. For example, M6P and/or derivatives thereof may be used at from 1 to 2,000 μg/kg, 1 to 1,500 μg/kg, 1 to 1,000 μg/kg, 1 to 500 μg/kg, 1 to 100 μg/kg, 10 to 2,000 μg/kg, 10 to 1,500 μg/kg 10 to 1,000 μg/kg, 10 to 500 μg/kg, and 10 to 100 μg/kg, 50 to 2,000 μg/kg, 50 to 1,500 μg/kg, 50 to 1,000 μg/kg, 50 to 500 μg/kg, and 50 to 100 μg/kg body weight and all values between the aforementioned ranges. In an embodiment, M6P and/or derivatives thereof can be used at 850 μg/kg administered subcutaneously. In an embodiment, M6P and/or derivatives thereof can be used at 100 to 1,000 μg/kg. In specific embodiments, M6P and/or derivatives thereof can be used at 50, 100, 150, 200, 250, 300, 350, 400, 450, 500, 550, 600, 650, 700, 750, 800, 850, 900, 950, 1000, 1,250, 1,500, 1,750, and 2,000 μg/kg body weight. Further, based on the data provided herein on animals, one skilled in the art can obtain relevant human dosage. Guidance for such conversions is known in the art (See, for example, Nair et al., J. Basic Clin. Pharma. v. 7(2), March 2016-May 2016; 27-31, incorporated herein by reference).

M6P may be present in the form of the free phosphoric acid or a pharmaceutically acceptable mono- or di-salt thereof, such as, for example as sodium, calcium, magnesium or barium salt. It may also be provided as a M6P containing compound from which it may be released in vivo, or it may be provided as a precursor from which it may be produced in vivo. M6P derivatives may also be present (where applicable (e.g., L3, L7, and L8)) as free acids or as salts thereof (e.g., monosodium or disodium salts thereof).

In one aspect, this disclosure provides a method of memory enhancement in a subject in whom enhancement of memory is needed or desired, comprising administering to the subject, a composition comprising, or consisting essentially of, M6P or derivatives thereof. The subject may be a human. The subject may be of any age or gender. The subject may or may not have been diagnosed with a memory related condition. In one embodiment, the present invention provides compositions comprising or consisting essentially of M6P or derivatives thereof for ameliorating memory diseases or memory impairment, or for enhancement of normal memory. In one embodiment, M6P or derivatives thereof is the only agent in the composition that specifically binds to the IGF-2 receptor. The compositions and methods of the present disclosure can be used to enhance memory or prevent, delay onset, or treat memory impairment. The present method can increase mental registration, retention or recall of past experiences, knowledge, ideas, sensations, thoughts or impressions. In an embodiment, the present compositions comprising M6P or derivatives thereof increase short and/or long-term information retention, working memory, facility with spatial relationships, memory (rehearsal) strategies, and verbal retrieval and production. In an embodiment, the present compositions comprising, or consisting essentially of M6P or derivatives thereof can improve hippocampal-dependent learning, associative learning, short-term memory, working memory and/or spatial memory. These responses can be measured by standard memory and/or cognitive tests known in the art.

In an embodiment, the present disclosure provides a method of treatment of diseases in which there is protein aggregation in the brain, such as, for example, neurodegenerative diseases such as Alzheimer's disease, Parkinson's disease, Lewy body disease, and the like. The method comprises administering to a subject in need of treatment a composition comprising, or consisting essentially of, M6P or derivatives thereof. In an embodiment, this disclosure provides a method of treating a neurodegenerative disease, including Huntington's disease, Parkinson's disease, amyotrophic lateral sclerosis (ALS), and neurodegeneration due to aging comprising administering to a subject in need of treatment a composition comprising, or consisting essentially of, M6P or derivatives thereof. In an embodiment, this disclosure provides a method of treating memory impairment associated with head injury, spinal cord injury, seizure, stroke, epilepsy, ischemia, neuropsychiatric syndromes, CNS damage resulting from viral encephalitis, CNS damage resulting from meningitis, or CNS damage resulting from a tumor comprising administering to a subject in need of treatment a composition comprising, or consisting essentially of, M6P. In an embodiment, this disclosure provides a method of enhancement of memory retention in a normal subject that is not afflicted with a neurodegenerative disease or pathological condition affecting neurological function comprising administering to a subject in need of treatment a composition comprising, or consisting essentially of, M6P or derivatives thereof.

The agents of the present disclosure can be provided in pharmaceutical compositions for administration by combining them with suitable pharmaceutically acceptable carriers, excipients and/or stabilizers. Examples of pharmaceutically acceptable carriers, excipients and stabilizer can be found in *Remington: The Science and Practice of Pharmacy* (2005) 21st Edition, Philadelphia, PA. Lippincott Williams & Wilkins. M6P can be used in a suspension, solution, gel or solid form. Suitable carriers include excipients, or stabilizers which are nontoxic to recipients at the dosages and concentrations employed, and include buffers such as acetate, Tris, phosphate, citrate, and other organic acids; antioxidants including ascorbic acid and methionine; preservatives such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol; amino acids such as glycine, glutamine, asparagine, histidine, arginine, or lysine; monosaccharides, disaccharides, and other carbohydrates including glucose, mannose, or dextrins; chelating agents such as EDTA; tonicifiers such as trehalose and sodium chloride; sugars such as sucrose, mannitol, trehalose or sorbitol; surfactant such as polysorbate; salt-forming counter-ions such as sodium; and/or non-ionic surfactants such as Tween or polyethylene glycol (PEG). The pharmaceutical compositions may contain from 0.01 to 99% weight per volume or weight per weight of the active material (e.g., M6P, M6P derivatives or IGF-2 modifications (e.g., IGF-2 analogs)).

Administration of present compositions can be carried out using any suitable route of administration known in the art. For example, the compositions may be administered via intravenous, intramuscular, intraperitoneal, intracerebrospinal, subcutaneous, intra-articular, intrasynovial, oral, topical, or inhalation routes. The compositions may be administered parenterally or enterically. In an embodiment, the compositions of the present disclosure can be administered orally, such as, for example, in the form of a tablet, capsule, pill, powder, paste, granules, elixir, solution, suspension, dispersion, gel, syrup or any other ingestible form. M6P or derivatives may be delivered via liposomes, microparticles, microcapsules. The compositions may be introduced as a single administration or as multiple administrations or may be introduced in a continuous manner over a period of time. For example, the administration(s) can be a pre-specified number of administrations or daily, weekly or monthly administrations, which may be continuous or intermittent, as may be clinically needed and/or therapeutically indicated.

In an embodiment, M6P or an M6P derivative in the composition is not linked (e.g., is not covalently bound either directly or via linker) to any other moiety and does not act as a carrier for any other moiety or agent.

In an aspect, this disclosure provides M6P derivatives and compositions comprising mannose derivatives. Derivatives of M6P can be made by performing chemistry at carbon 1 and/or carbon 6 of M6P. Various methods of performing chemistry at carbon 1 and/or carbon 6 of hexoses are known in the art. Examples of M6P derivatives include, but are not limited to, phosphonate (L2), ethyl ester (L3), methyl malonate (L4), phosphonic acid (L5), carboxylate (L6), malonate (L7), alkyne (L8), and alkyne prodrug (L9). In an embodiment, this disclosure provides a compound selected from the group consisting of L2, L3, L4, L5, L6, L7, L8 and L9. In an embodiment, this disclosure provides a composition comprising one or more of L1, L2, L3, L4, L5, L6, L7, L8 and L9.

The following examples are provided as illustrative examples and are not intended to be restrictive in any way.

EXAMPLE 1

This example demonstrates that systemic administration of mannose-6-phosphate (M6P) enhances memory in normal rodents and reverses memory deficit in a mouse model. We tested different concentrations of M6P for memory enhancement. Results are shown in FIG. 1.

Figure 2:
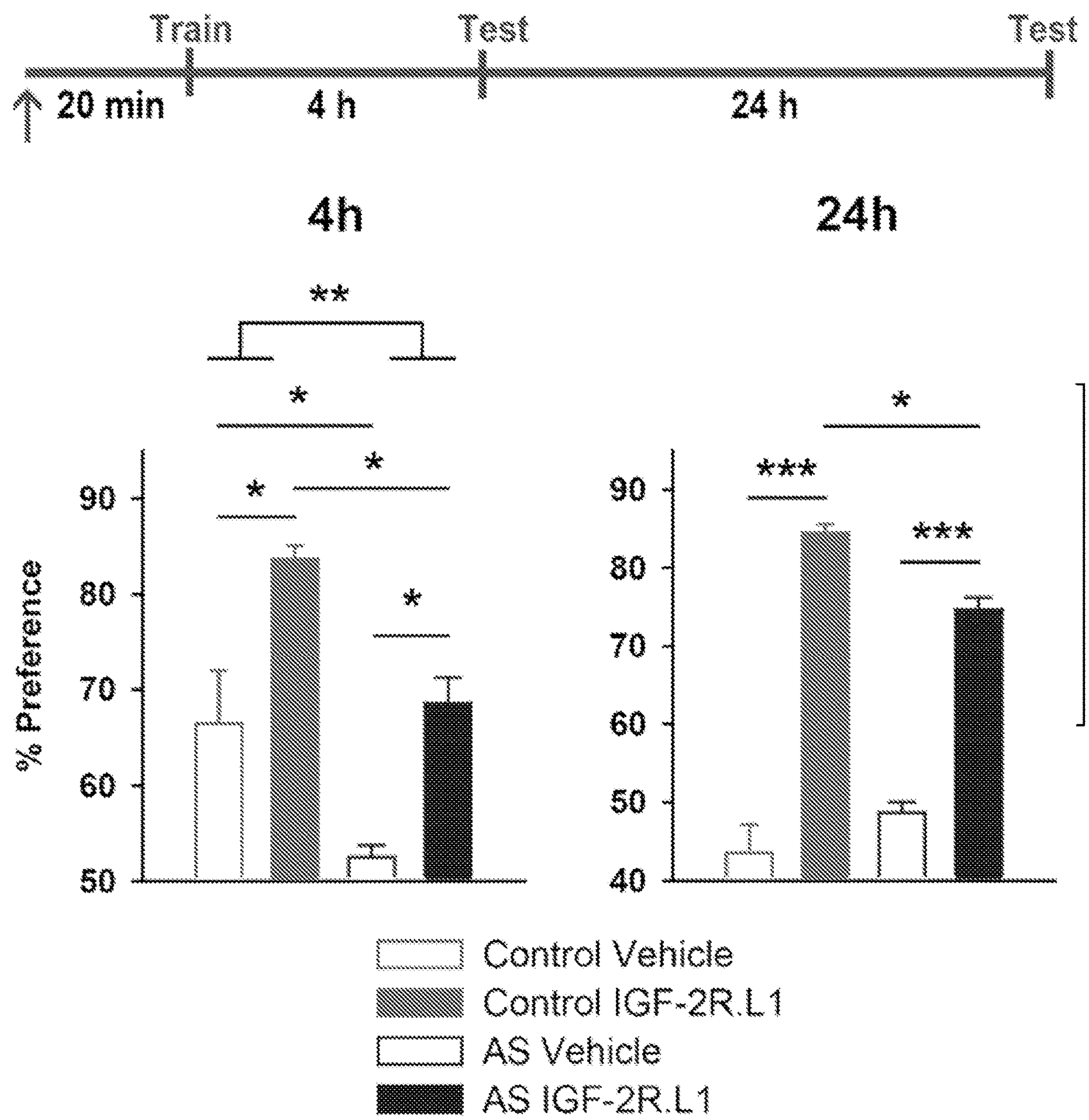
FIG. 2. M6P reverses object recognition memory deficits in a mouse model of Angelman syndrome and enhances memory in WT mice. Experimental timelines are shown above graphs. In all experiments mice received a s.c. injection of vehicle or M6P (↑) 20 min before nOR training or testing. Percent exploration preference for a novel object compared to a familiar object during novel object recognition of WT (Control) and Ube3a−/+(AS) mice injected with vehicle or M6P (labeled as IGF-2R.L1), 20 min before training, tested at 4 h and 24 h after training. N=4/group. All data are expressed as the mean (±s.e.m.). Two-way analysis of variance (ANOVA) followed by Tukey post-hoc tests. *P<0.05, P<0.01, *P<0.001.
Figure 3:
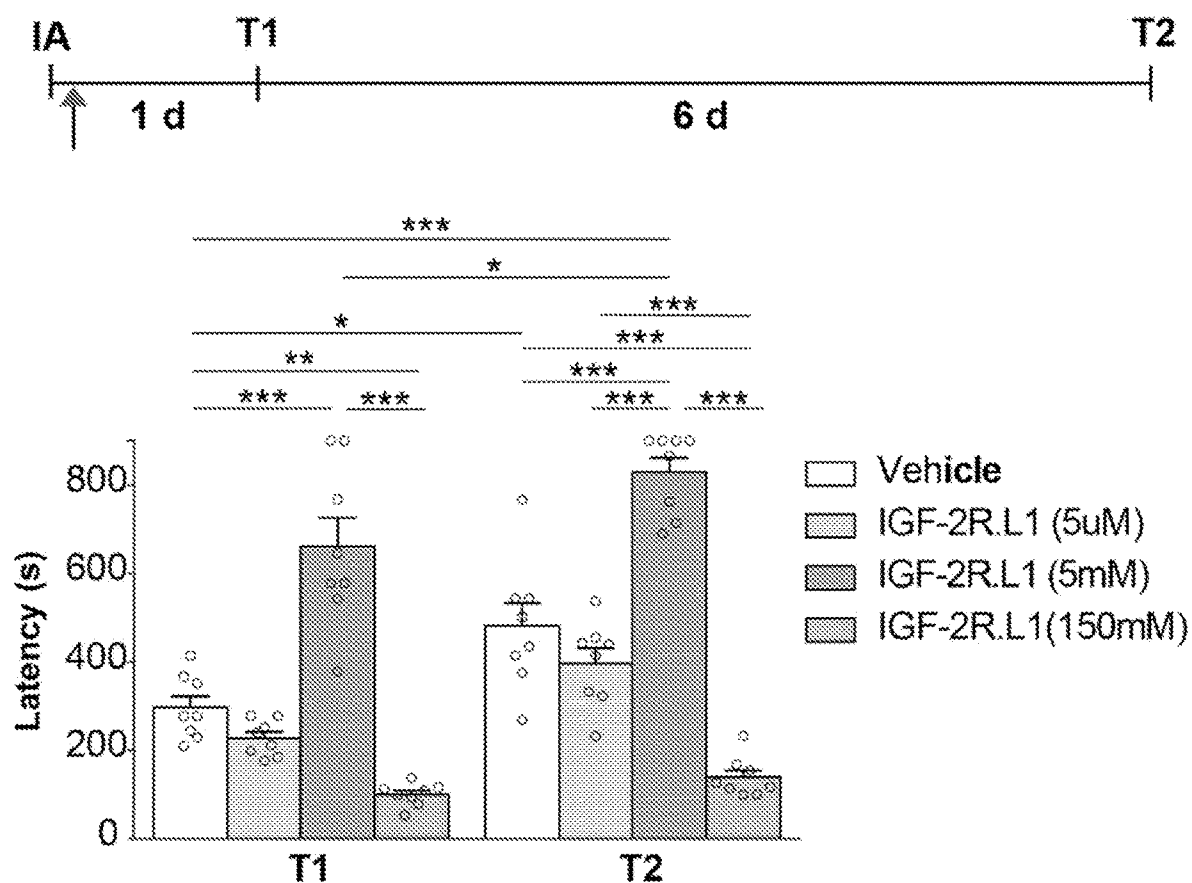
FIG. 3. M6P injected into the hippocampus of rats enhances memory: dose-response curve. Experimental timeline is shown above graph. Rats received a bilateral intra-hippocampal injection of vehicle or different doses of IGF-2R.L1 (M6P) (↑) immediately after training in the contextual fear memory task inhibitory avoidance (IA). Memory retention was then tested at 24 hours (T1) and 7 days (T2) after training. Testing measured the latency to enter the compartment in which the animals received a foot shock during training. N=12/group. All data are expressed as the mean (±s.e.m.). Two-way repeated measures analysis of variance (ANOVA) followed by Bonferroni post-hoc tests. *P<0.05, P<0.01, *P<0.001.

We found M6P administered systemically in mice modeling Angelman syndrome (Ube3a−/+mice, AS mice) reverses their memory impairments (FIG. 2). We also confirmed that this ligand acts as a cognitive enhancer in both mice and rats with either systemic or intra-cerebral injection (FIGS. 2 and 3).

Specifically, we used the novel object recognition (nOR) paradigm in mice to assess non-aversive episodic memory. In this task, the innate preference for novelty of the rodent is used. During training, the mouse is allowed to explore 2 identical objects. On test day, one of the training objects is replaced with a novel object. Because mice have an innate preference for novelty, if the mouse recognizes the familiar object, it will spend more time at the novel object.

A s.c. injection of M6P reversed memory impairment of AS mice. As depicted in FIG. 2, testing at 4 h after nOR training revealed that, whereas control (wild type littermates, WT) mice injected with control solution (vehicle) had a strong memory, vehicle-injected AS mice showed significant memory impairments, confirming their established memory deficits. M6P injection prior to training reversed memory deficits in AS mice, which in fact had memory retention levels similar to those of control WT mice.

Furthermore, control mice injected with M6P showed a significant memory enhancement compared to mice injected with vehicle, indicating that M6P is a potent memory-enhancer in normal animals. When tested at 24 h after training both control and AS mice injected with vehicle showed little or no memory for the old object. However, an injection of M6P significantly increased memory retention in both groups, further supporting the conclusion that the activation of the IGF-2 receptor, via M6P during learning is very effective in enhancing memory retention and persistence.

We also found that M6P significantly enhances memory retention in rats when injected bilaterally into the hippocampus of rats. In these experiments, adult rats were trained in the inhibitory avoidance (IA) paradigm. In this paradigm the animals learn to avoid a chamber paired with a foot-shock. As shown in FIG. 3, rats that received a bilateral injection into the hippocampus of M6P immediately after training had a significant increase in avoidance memory tested 1 day after training compared to rats that received vehicle injection. The effect persisted at another testing repeated 6 days later. The memory-enhancing effect of M6P was dose dependent.

Figure 4:
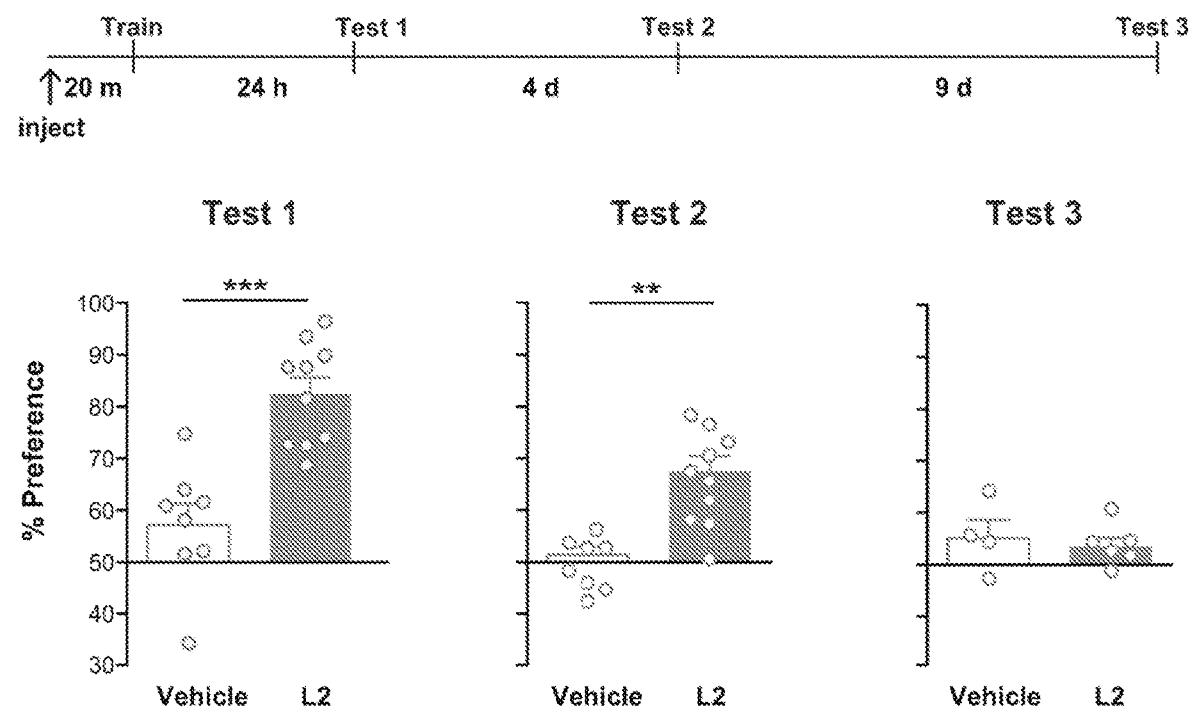
FIG. 4. An M6P derivative, phosphonate M6P (PnM6P), enhances memory in mice. Experimental timeline is shown above graphs. Mice received a s.c. injection of either vehicle or 850 μg/Kg of phosphonate-M6P (PnM6P) called IGF-2R.L2 (or L2) (↑) 20 min before training. (A) Percent exploration preference for a novel object compared to a familiar object during the nOR paradigm of mice injected with vehicle or L2 20 min before training, and tested at 24 h (Test 1), 5 days (Test 2) and 14 days (Test 3) after training. N=8-10/group. Data are expressed as the % mean±s.e.m. (B). Total time spent exploring both objects during the nOR training session of mice injected with vehicle or L2 20 min before training. N=4 per group. Similar exploration time shows that there was no basal bias in object exporation/interest confirming that changes in A are due to changes in memory retention. Data are expressed in seconds (s). Two-way analysis of variance (ANOVA) followed by Bonferroni post-hoc tests. *P<0.05, P<0.01, *P<0.001.
Figure 4:
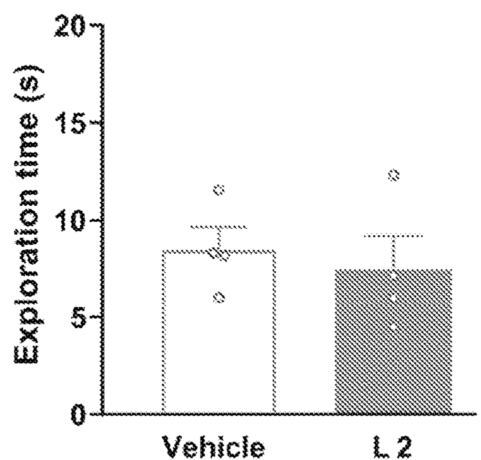

We found that an M6P derivative, phosphonate M6P, PnM6P (also called IGF-2R.L2 or L2), significantly enhances memory when injected subcutaneously (s.c.) in mice. Specifically, we used the novel object recognition (nOR) paradigm in mice. Mice injected with PnM6P(L2) showed a significant memory enhancement compared to mice injected with vehicle, indicating that L2 is a potent memory-enhancer in normal animals (FIG. 4). When tested at 24 h and 5 days after training mice injected with vehicle showed little or no memory for the old object. However, an injection of L2 significantly increased memory retention at both timepoints after training, indicating that L2 significantly increases memory retention and persistence. The memory enhancement was no longer seen when the mice were tested again 9 days later (at 14 days after training). At this timepoint both vehicle-injected and L2-injected mice showed chance preference (no memory).

Figure 5:
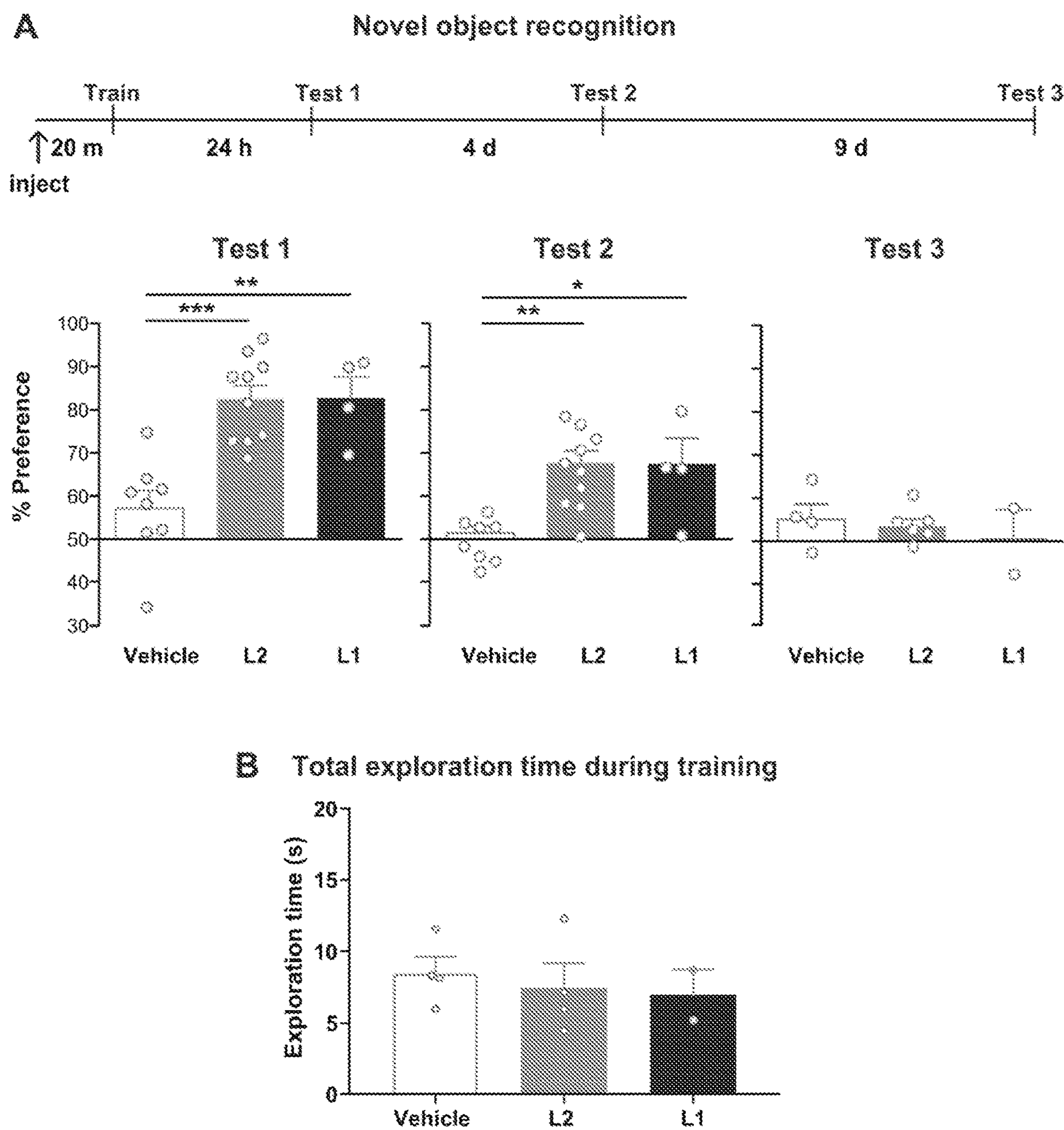
FIG. 5. Comparing M6P (L1) and PnM6P (L2) effects on memory retention: both L1 and L2 similarly enhance nOR in mice. Experimental timeline is shown above graphs. Mice received a s.c. injection of either vehicle or 850 μg/Kg of phosphonate-M6P (PnM6P) called IGF-2R.L2 (or L2) or 850 μg/Kg of M6P (IGF-2R.L1 or L1) (↑) 20 min before training. (A) Percent exploration preference for a novel object compared to a familiar object during the nOR paradigm of mice injected with vehicle, L2 or L1 20 min before training, and tested at 24 h (Test 1), 5 days (Test 2) and 14 days (Test 3) after training. N=4-10/group. Data are expressed as the % mean±s.e.m. (B). Total time spent exploring both objects during the nOR training session of mice injected with vehicle, L2 or L1 20 min before training. N=2-4 per group. Similar total exploration time indicate that the preference data were not due to change in object exploratory/interest behavior but in memory. Data are expressed in seconds (s). Two-way analysis of variance (ANOVA) followed by Bonferroni post-hoc tests. *$P<0.05$, $P<0.01$, *$P<0.001$.

When L2 (PnM6P) was compared to the effect of L1 (M6P), no difference was found in memory enhancing effects at 24 hours, 5 days or 14 days after training (FIG. 5). Both L1 and L2 injections led to similar significant memory enhancement at 24 h and 5 days after training. The effects of both returned to baseline at 14 days after training.

Figure 6:
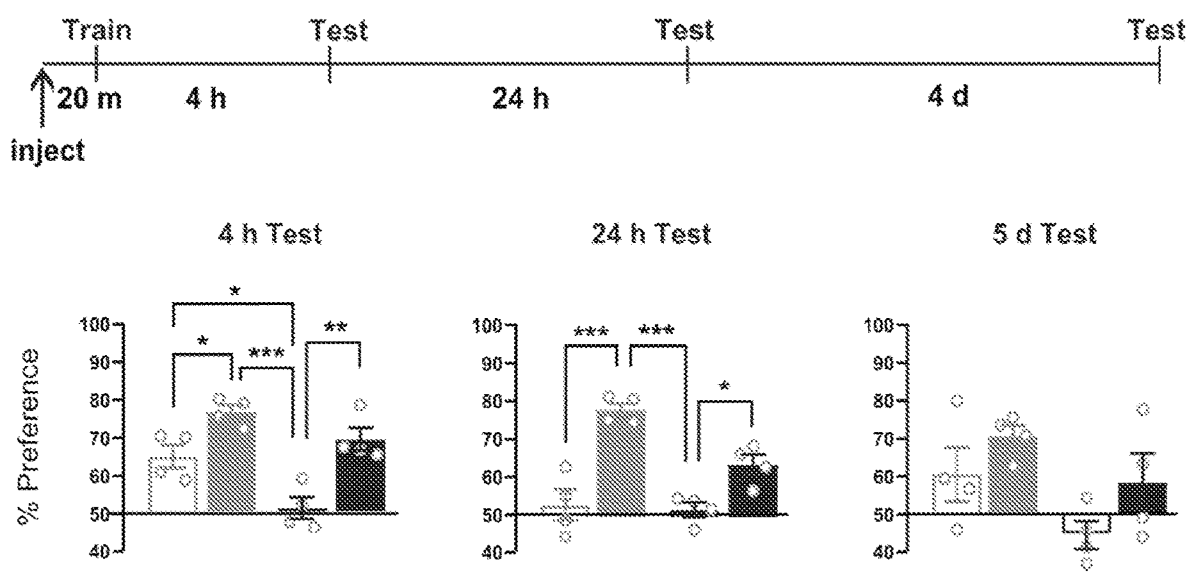
FIG. 6. PnM6P (L2) reverses object recognition memory deficits in a mouse model of Angelman syndrome. Experimental timeline is shown above graphs. Mice received a s.c. injection of either vehicle or 850 μg/Kg of phosphonate-M6P (PnM6P) called IGF-2R.L2 (or L2) (↑) 20 min before either training or testing. (A) Percent exploration preference for a novel object compared to a familiar object during the nOR paradigm of wild type (WT served as Control mice) and Ube3a−/+(AS) mice injected with vehicle or L2 before training, and tested at 4 h, 24 h and 5 days (5d) after training. N=4/group. Data are expressed as the % mean±s.e.m. (B). Total time spent exploring the 2 objects during the nOR training session of WT and AS mice injected with vehicle or L2 20 min before training. N=4/per group. Similar total exploration time indicate that the preference data were not due to change in object exploratory/interest behavior but in memory. Data are expressed in seconds (s). Two-way analysis of variance (ANOVA) followed by Bonferroni post-hoc tests. *$P<0.05$, $P<0.01$, *$P<0.001$.
Figure 6:
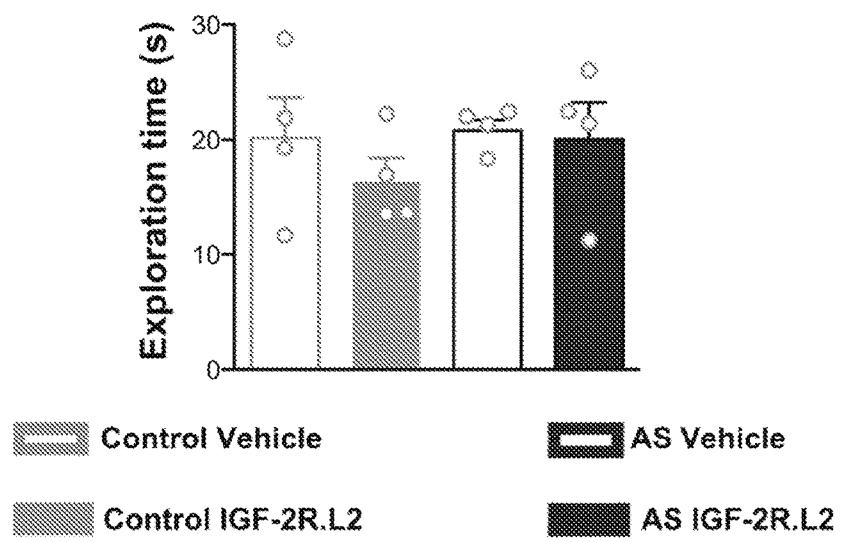

L2 significantly reversed memory deficits in an Angelman syndrome (AS) mouse model. A s.c. injection of PnM6P reversed memory impairment of AS mice, as depicted in FIG. 6. NOR memory, tested at 4 h after training, revealed that, whereas control (wild type littermates, WT) mice injected with control solution (vehicle) had a strong memory, vehicle-injected AS mice showed significant memory impairments, confirming their established memory deficits. L2 injection prior to training reversed memory deficits in AS mice, which in fact at 4 h after training had memory retention levels similar to those of control WT mice. Furthermore, as described in 0034 and 0035 WT mice injected with L2 showed enhanced memory at 4 h after training. Re-testing at 24 h after training showed that both vehicle-injected control (WT) and AS mice had no memory, but L2 injection led to significant memory in both groups.

EXAMPLE 2

This example describes the synthesis and characterization of M6P derivatives.

General Synthetic Procedures

All reactions were performed in flame-dried or oven-dried glassware under a positive pressure of nitrogen or argon with magnetic stirring, unless otherwise stated. Anhydrous dichloromethane ($CH_2Cl_2$), diethyl ether ($Et_2O$), 1,4-dioxane, tetrahydrofuran (THF), toluene (PhMe), and N,N-dimethylformamide (DMF) were obtained by passing the solvent through activated alumina columns into flame-dried glassware. Other solvents and reagents were used as obtained from commercial vendors (Acros Organics, AK Scientific, Alfa Aesar, Chem-Impex International, Combi-Blocks, Sigma-Aldrich, Strem Chemicals, Synthonix, Tokyo Chemical Industry Co.) unless otherwise described. Thin-layer chromatography (TLC) was performed for reaction monitoring using silica gel 60 glass plates pre-coated with $F_{254}$ fluorescent indicator (Millipore Sigma) and visualized by blocking of ultraviolet light ($\lambda$=254 nm) or by staining with aqueous potassium permanganate ($KMnO_4$) solution, aqueous acidic ceric ammonium molybdate (IV) (CAM) solution, acidic ethanolic p-anisaldehyde solution, or butanolic ninhydrin solution, followed by gentle heating with a heat gun. Flash-column chromatography was performed at room temperature under pressure of nitrogen with silica gel (60 Å, 40-63 μm, Silicycle or Merck) using glass columns or a Teledyne Isco MPLC CombiFlash® Rf+. Proton nuclear magnetic resonance ($^1H$ NMR) spectra were recorded on a Bruker Avance III HD 400 MHz spectrometer equipped with a CryoProbe™ at 25° C., are reported in parts per million (ppm, δ scale) downfield from tetramethylsilane (TMS, δ=0 ppm), and are referenced internally to the residual protium resonances of the NMR solvent ($CDCl_3$: 7.26 [$CHCl_3$], $CD_3OD$: 4.87 [MeOH], $D_2O$: 3.31 [$H_2O$], $C_6D_6$: 7.16 [$C_6H_6$], $(CD_3)_2SO$: 2.50 [$(CH_3)_2SO$]). Proton-decoupled carbon-13 nuclear magnetic resonance ($^{13}C\{^1H\}$ NMR) spectra were recorded on a Bruker Avance III HD 400 MHz spectrometer equipped with a CryoProbe™ at 25° C., are reported in parts per million (ppm, δ scale) downfield from tetramethylsilane (TMS, δ=0 ppm), and are referenced internally to the central line of carbon-13 resonances of the NMR solvent ($CDCl_3$: 77.36 [$CHCl_3$], $CD_3OD$: 49.00 [MeOH], $(CD_3)_2SO$: 39.52 [$(CH_3)_2SO$]). Proton-decoupled phosphorus-31 nuclear magnetic resonance ($^{31}P\{^1H\}$ NMR) spectra were recorded on a Bruker Avance III HD 400 MHz spectrometer equipped with a CryoProbe™ at 25° C., are reported in parts per million (ppm, δ scale) downfield from phosphoric acid ($H_3PO_4$, δ=0), and are referenced externally to a triphenyl phosphate standard solution (0.0485 M in $CDCl_3$, δ=−17.7 ppm). The reported data are represented as:

chemical shift in parts per million (ppm, δ scale) (integration, multiplicity, coupling constants J in Hz, atom assignment). Multiplicities are abbreviated as: s, singlet; d, doublet; t, triplet; q, quartet; quint, quintet; sext, sextet; hept, heptet; br, broad; m, multiplet; or combinations thereof. High-resolution mass spectrometry (HRMS) was conducted using an Agilent 6224 Accurate-Mass time-of-flight (TOF) liquid-chromatography mass spectrometer (LC/MS) in combination with either atmospheric pressure chemical ionization (APCI) or electrospray ionization (ESI) methods. Fourier-transform infrared (FT-IR) spectra were recorded on a Thermo Scientific Nicolet 6700 FT-IR spectrometer referenced to a polystyrene standard. The signals are reported as frequency of absorption in wavenumbers ($cm^{-1}$) with descriptors abbreviated as: w, weak; m, medium; s, strong, br, broad. High-performance liquid chromatography (HPLC) purification was performed on an Agilent 1260 Infinity II LC with a reverse-phase (RP) Phenomenex Semi-preparative Column (00D-4439-E0 Gemini, C18 phase, 3 μm particle size, 110 Å pore size) with a flow rate of 8 mL/min and solvent mixtures of 0.1% formic acid (FA) in (A) acetonitrile (HPLC grade) and (B) water (HPLC grade). Optical rotation measurements were recorded on a Jasco P-2000 polarimeter with a Flint Glass Faraday cell modulator, sodium lamp light source, and photomultiplier tube (PMT) detector. Specific rotations were calculated based on the equation $[\alpha]=(100\cdot\alpha)/(l\cdot c)$ where the concentration c is in g/100 mL and the path length l is in decimeters. Calculated specific rotations are reported as unitless values and are represented as: $[\alpha]_D^T$ specific rotation (c concentration, solvent), where the temperature T is in ° C. and D stands for the sodium D-line monitor wavelength (589 nm).

Compound Synthesis and Characterization

Synthesis of L2

Methyl 6-O-Triphenylmethyl-α-D-mannopyranoside (2)

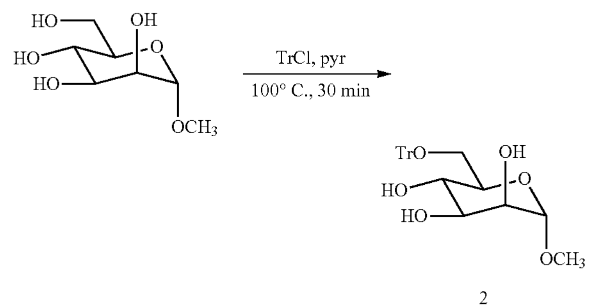

Trityl ether 2 was prepared following modified published procedures (Traboni et al., *ChemistrySelect* 2017, 2, 4906-4911; Tennant-Eyles et al., J. *Tetrahedron: Asymmetry* 2000, 11, 231-243). To a mixture of methyl-α-D-mannopyranoside (5.02 g, 25.8 mmol, 1.0 equiv) and trityl chloride (7.91 g, 28.4 mmol, 1.1 equiv) was added pyridine (5.2 mL, 64.6 mmol, 2.5 equiv). The reaction mixture was heated to 100° C. and stirred for 30 min. After 30 min, the resulting viscous paste was dissolved in $CH_2Cl_2$ by ultrasonication at 40° C. The solution was washed with saturated aqueous ammonium chloride (2×), dried over anhydrous sodium sulfate, filtered, and concentrated under reduced pressure. The crude residue was purified by flash column chromatography (50% to 100% ethyl acetate/hexanes) to afford 2 (11.0 g, 25.2 mmol, 98%) as a white foam. NMR spectra match those reported in the literature (Traboni et al., *ChemistrySelect* 2017, 2, 4906-4911; Tennant-Eyles et al., J. *Tetrahedron: Asymmetry* 2000, 11, 231-243). $^1$H NMR (400 MHz, $CDCl_3$) δ 7.48-7.28 (15H, m), 4.72 (1H, d, J=1.6 Hz), 3.92 (1H, m), 3.82-3.63 (3H, m), 3.50-3.39 (2H, m), 3.38 (3H, s), 2.73 (1H, m), 2.54 (1H, m), 2.27 (1H, m). $^{13}$C NMR (101 MHz, $CDCl_3$) δ 143.9, 128.9, 128.3, 127.5, 100.9, 87.7, 72.0, 70.64, 70.59, 70.1, 65.2, 55.3.

Methyl 2,3,4-Tri-O-benzyl-α-D-mannopyranoside (4)

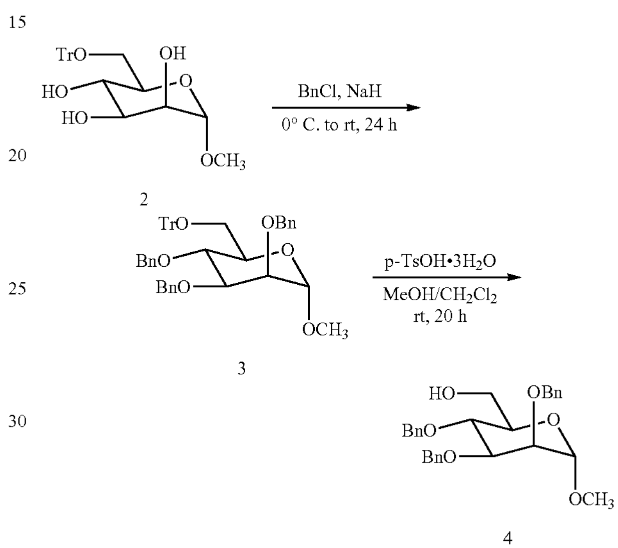

Benzyl ether 3 was prepared according to a modified published procedure (Hofmann et al., *Carbohydr. Res.* 2015, 412, 34-42). Trityl ether 2 (2.01 g, 4.61 mmol) was dissolved in anhydrous DMF (115 mL) and to this solution was added portion-wise a suspension of NaH (60% in mineral oil, 14.8 g, 371 mmol, 7.2 equiv) at 0° C. The reaction mixture was stirred for 10 min at 0° C. and to this mixture was slowly added benzyl chloride (39.1 g, 309 mmol, 6.0 equiv) and the suspension was stirred for 5 min at 0° C. then warmed to rt and stirred for 16 h. The reaction mixture was quenched with water and extracted with ethyl acetate. The organic layer was dried over anhydrous sodium sulfate and concentrated under reduced pressure to afford 3 as a viscous yellow oil, which was used directly in the following procedure.

Alcohol 4 was prepared according to a modified published procedure (Jaramillo et al., *J. Org. Chem.* 1994, 59, 3135-3141). Benzyl ether 3 was dissolved in MeOH—$CH_2Cl_2$ (2:1, 6 mL) and p-TsOH was added until pH<4. The reaction mixture was stirred at rt for 20 h then neutralized with $Et_3N$ and concentrated under reduced pressure. The residue was dissolved in $CH_2Cl_2$ and washed with distilled water and brine. The organic layer was dried over anhydrous sodium sulfate and concentrated under reduced pressure. The crude residue was purified by flash column chromatography (30% to 60% ethyl acetate/hexanes) to yield alcohol 4 (0.90 g, 1.94 mmol, 42%) as a light-yellow syrup. NMR spectra match those reported in the literature (Norberg et al., *Carbohydr. Res.* 2017, 452, 35-42). $^1$H NMR ($CDCl_3$, 400 MHz) δ 7.41-7.30 (15H, m), 4.97 (1H, d, J=10.9 Hz), 4.81 (1H, d, J=12.3 Hz), 4.75-4.65 (5H, m), 3.99 (1H, app. t, J=9.4 Hz), 3.92 (1H, dd, J=9.4, 2.9 Hz), 3.90-3.84 (1H, m), 3.83-3.76

(2H, m), 3.68-3.62 (1H, m), 3.33 (3H, s), 2.00 (1H, app. t, J=6.4 Hz). $^{13}$C NMR (101 MHz, $CDCl_3$) δ 138.8, 138.7, 138.6, 128.70, 128.68, 128.67, 128.3, 128.1, 128.0, 127.9, 99.6, 80.5, 75.5, 75.2, 75.0, 73.2, 72.5, 72.4, 62.7, 55.1. HRMS (APCI/LC-TOF) m/z: $[M+NH_4]^+$ Calcd for $C_{28}H_{32}O_6$ 482.2537; Found 482.2533.

Methyl 2,3,4-Tri-O-benzyl-6-deoxy-6-diethoxyphosphinylmethylene-α-D-mannopyranoside (7)

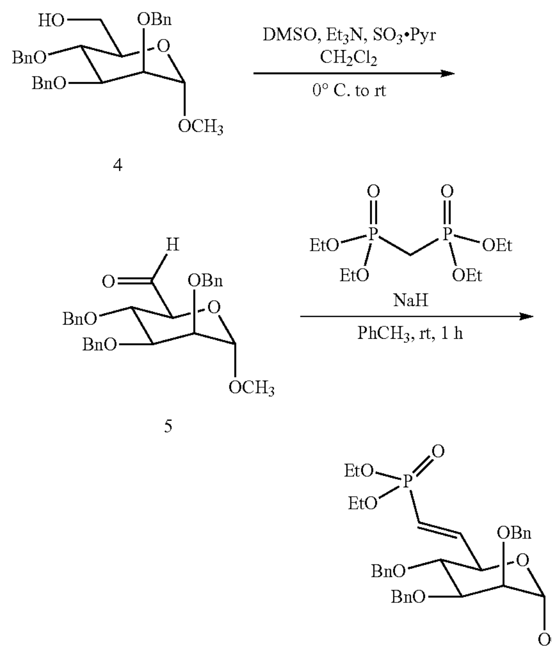

Aldehyde 5 was prepared according to a general procedure for oxidation of primary alcohols (Tojo et al., *Oxidation of alcohols to aldehydes and ketones: a guide to current common practice*. Springer Science & Business Media: 2006). A solution of 4 (0.334 g, 0.72 mmol, 0.4 M) was prepared in anhydrous DMSO (1.8 mL) under nitrogen. To this solution was added $Et_3N$ (1.0 mL, 7.2 mmol, 10 equiv) and the reaction mixture was cooled to 0° C. in an ice water bath and stirred. To this solution was added dropwise a solution of sulfur trioxide-pyridine complex (0.347 g, 2.2 mmol, 3.0 equiv) in DMSO (1 mL) at 0° C. The reaction mixture was warmed to room temperature and stirred for 20 h. The solution was diluted with $CH_2Cl_2$ and washed with distilled water, dried over anhydrous sodium sulfate, and concentrated under reduced pressure to yield 5 as a yellow oil. The oil was filtered over a plug of silica and used directly in the following procedure.

Phosphonate 7 was prepared according to a modified published procedure (Vidil et al., *Eur. J. Org. Chem.* 1999, 447-450). To a suspension of NaH (60% in mineral oil, 37.8 mg, 0.945 mmol, 2.2 equiv) in anhydrous toluene (2 mL) was added dropwise tetraethyl methylenediphosphonate (0.27 mL, 1.08 mmol, 2.5 equiv) and stirred 30 min at rt. A solution of 5 in anhydrous toluene (5 mL) was added dropwise to this mixture under nitrogen and stirred at rt for 2 h. The reaction mixture was diluted with $CH_2Cl_2$ and quenched with distilled water. The organic layer was extracted with $CH_2Cl_2$ (3×), dried over anhydrous sodium sulfate, and concentrated under reduced pressure. The crude residue was purified by flash column chromatography (40% to 100% ethyl acetate/hexanes) to afford 7 as a colorless syrup (162 mg, 0.272 mmol, 62%). NMR spectra match those reported in the literature (Vidil et al., *Eur. J. Org. Chem.* 1999, 447-450). $[\alpha]_D^{20}$=+40.4 (c=1.01, $CHCl_3$). $^1$H NMR ($CDCl_3$, 400 MHz) δ 7.39-7.27 (15H, m), 6.96 (1H, ddd, J=22.1, 17.2, 4.3 Hz), 6.12 (1H, ddd, J=21.2, 17.5, 1.8 Hz), 4.88 and 4.59 (2H, $AM_q$, J=10.6 Hz), 4.77 and 4.70 (2H, $AB_q$, J=12.4 Hz), 4.73 (1H, s), 4.63 (2H, s), 4.14-4.03 (5H, m), 3.90 (1H, dd, J=9.3, 3.0 Hz), 3.81-3.77 (1H, m), 3.72 (1H, t, J=9.5 Hz), 3.29 (3H, s), 1.31 (6H, t, J=7.1 Hz). $^{13}$C NMR ($CDCl_3$, 101 MHz) δ 148.4 (d, J=5.8 Hz), 138.7, 138.5, 138.3, 128.7, 128.4, 128.14, 128.05, 127.9, 118.3 (d, J=188.2 Hz), 99.6, 80.4, 78.5 (d, J=1.9 Hz), 75.7, 75.0, 73.2, 72.7, 71.5 (d, J=21.5 Hz), 62.1 (dd, J=5.8, 1.3 Hz), 55.3, 16.7. $^{31}$P NMR (162 MHz, $CDCl_3$) δ 18.3. FT-IR (neat, $cm^{-1}$): ν(C—H)=2982 (m), ν(P═O)=1253 (s), ν(P—O—C)=1024 (s), ν(P—O—C)=969 (m).

Methyl 2,3,4-Tri-O-benzyl-6-deoxy-6-diisopropyloxycarbonyloxy-methyl-phosphinylmethylene-α-D-mannopyranoside (10)

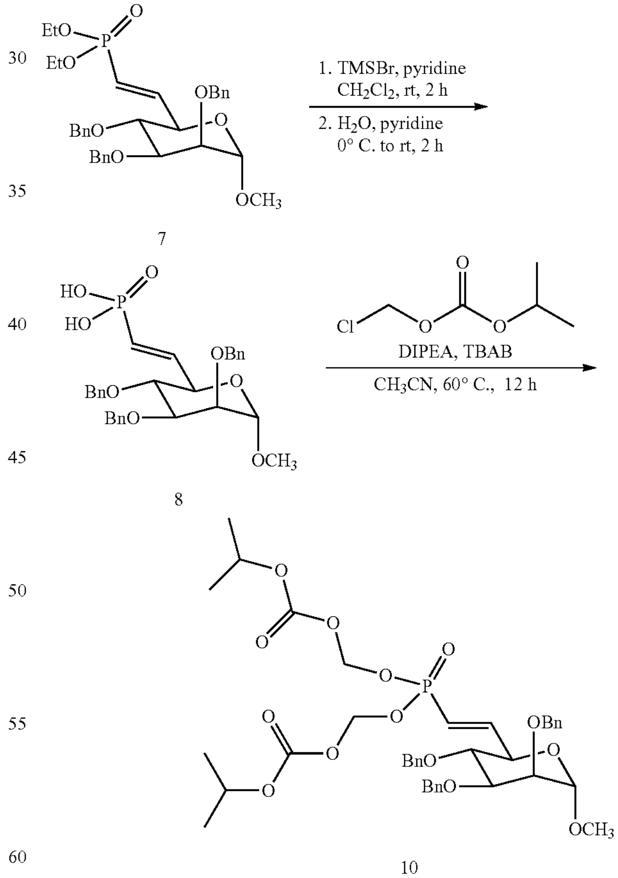

Phosphonic acid 8 was prepared according to a published procedure (Vidil et al., *Eur. J. Org. Chem.* 1999, 447-450). To a solution of 7 (0.146 g, 0.245 mmol, 1 equiv) in anhydrous $CH_3CN$ (5.6 mL) under nitrogen was added pyridine (31 μL, 0.392 mmol, 1.6 equiv) and trimethylsilyl bromide (0.32 mL, 2.45 mmol, 10 equiv) with stirring at room temperature. After 2 h, the reaction mixture was cooled to 0° C. and was added pyridine (51 μL, 0.634 mmol, 2.6 equiv) and $H_2O$ (185 μL, 10.3 mmol, 42 equiv) then warmed to rt and stirred. After 2 h, the reaction mixture was diluted with $CH_2Cl_2$ and 2 M HCl (4 mL) and $H_2O$ (4 mL). The organic layer was extracted with $CH_2Cl_2$, dried over anhydrous sodium sulfate, and concentrated under reduced pressure to yield 8 as a brown oil. The crude residue was used directly in the following procedure.

Phosphonate 10 was prepared following a modified procedure (Graham et al., (2017). International Patent Appl. Publication No. WO2017/87256). A mixture of 8 in anhydrous $CH_3CN$ under nitrogen was treated with DIPEA (0.480 mL, 2.76 mmol, 9.9 equiv), TBAB (93.1 mg, 0.289 mmol, 1.0 equiv), and chloromethyl isopropyl carbonate (0.30 mL, 2.24 mmol, 8.1 equiv) then was heated to 60° C. After stirring for 16 h, the reaction mixture was concentrated under reduced pressure. The crude residue was purified by flash column chromatography (30% to 100% ethyl acetate/hexanes) to yield 10 as a colorless oil (116 mg, 0.150 mmol, 54%). TLC (EtOH/EtOAc/hexanes 1.5:1.5:7): $R_f$=0.49. $^1H$ NMR ($CDCl_3$, 400 MHz) δ 7.40-7.29 (15H, m), 7.10 (1H, ddd, J=24.5, 17.2, 3.8 Hz), 6.40-6.17 (1H, m), 5.80-5.65 (6H, m), 4.81-4.59 (7H, m), 4.22-4.14 (1H, m), 3.91 (1H, dd, J=9.3, 3.1 Hz), 3.83-3.78 (1H, m), 3.74 (1H, t, J=9.5 Hz), 3.30 (3H, s), 1.32-1.29 (12H, m). $^{13}C$ NMR ($CDCl_3$, 101 MHz) δ 153.5, 138.7, 138.5, 138.3, 128.8, 128.7, 128.6, 128.2, 128.1, 127.9, 99.7, 84.5 (d, J=5.7 Hz), 84.4 (d, J=6.8 Hz), 80.5, 78.3 (d, J=2.1 Hz), 75.8, 75.0, 73.5 (d, J=3.5 Hz), 73.3, 72.7, 71.3 (d, J=22.3 Hz), 55.3. $^{31}P$ NMR (162 MHz, $CDCl_3$) δ 26.3.

L2

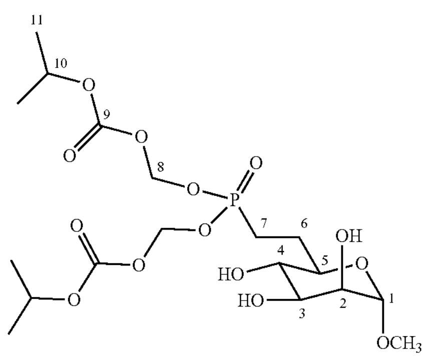

Methyl 6-Deoxy-6-diisopropyloxycarbonyloxymethyl-phosphinylmethyl-α-D-mannopyranoside (L2)

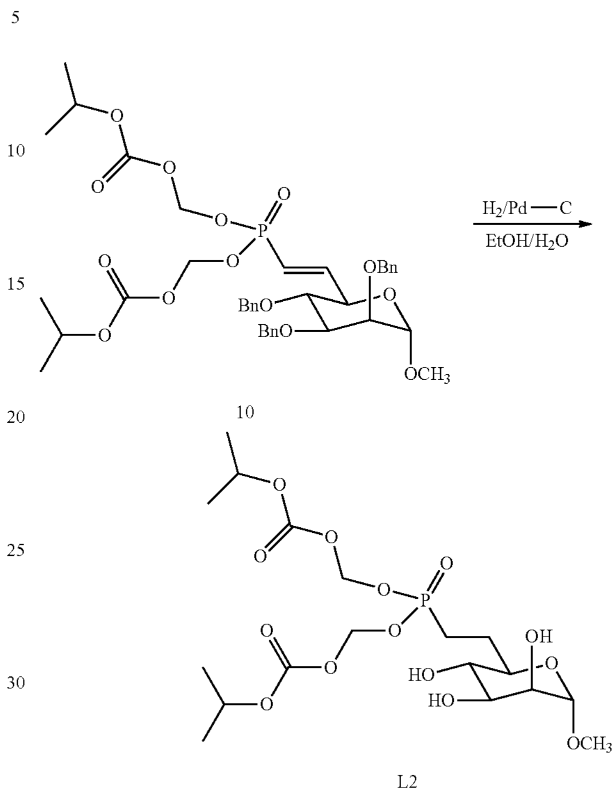

The final step in the synthesis of L2 was performed according to a published hydrogenation procedure (Jeanjean et al., *Bioorg. Med. Chem. Lett.* 2008, 18, 6240-6243). In an oven-dried vial 10 (36.0 mg, 0.047, 1 equiv) was dried and degasses under high vacuum. To this was added 10% Pd/C (36.6 mg, 0.344 mmol, 7.4 equiv) and rinsed down with $CH_2Cl_2$ (2 mL) and EtOH (2 mL). The reaction mixture was subsurface sparged with $N_2$ for 1 min. The reaction mixture was then degassed under reduced pressure and the atmosphere was replaced by $H_2$ (5×). The reaction mixture was stirred vigorously under $H_2$ for 4 h, after which time the reaction mixture was degassed under reduced pressure and refilled with $N_2$ (5×). The reaction mixture was diluted with $CH_2Cl_2$ (2 mL) and filtered over a plug of wet celite. The filtered organic layer was concentrated under reduced pressure and the crude residue was purified by HPLC (40% to 85% [$H_2O$+0.1% FA]:[$CH_3CN$+0.1% FA], $t_R$(L2)=7.00 min) to afford L2 (10.1 mg, 0.020 mmol, 43%) as a white solid. All $^{13}C$-$^{31}P$ coupling constants are within the standard range of values (Buchanan et al., *Can. J. Chem.* 1976, 54, 231-237). $^1H$ NMR (400 MHz, $CDCl_3$) δ 5.68 (2H, dd, J=20.5 Hz, J=5.3 Hz, H8), 5.65 (2H, dd, J=18.3 Hz, J=5.4 Hz, H8'), 4.93 (2H, hept, J=6.3 Hz, H10), 4.68 (1H, s, H1), 3.95-3.86 (1H, br, H5), 3.74 (1H, m, H2), 3.58 (2H, m, H3, H4), 3.35 (3H, s, O$\underline{CH_3}$), 3.22-3.07 (1H, m, OH), 2.95 (2H, m, 2×OH), 2.27-2.07 (2H, m), 2.06-1.86 (2H, m, H6, H6', H7, H7'), 1.32 (12H, d, J=6.2 Hz, H11). $^{13}C$ NMR (101 MHz, $CDCl_3$) δ 153.6 (d, J=3.7 Hz, C9), 101.2 (s, C1), 84.5 (d, J=6.3 Hz, C8), 84.3 (d, J=6.3 Hz, C8'), 73.7 (d, J=3.2 Hz, C10), 72.0 (s, C2), 70.9 (d, J=16.1 Hz, C5), 70.6 (s), 70.5 (s, C3, C4), 55.3 (s, O$\underline{C}H_3$), 23.8 (d, J=4.5 Hz, C6), 22.4 (s, C11), 21.7 (d, J=142.3 Hz, C7). $^{31}$P NMR (162 MHz, $CDCl_3$) δ 34.4. FT-IR (neat, $cm^{-1}$): ν(O—H)=3409 (br), ν(C—H)=2923 (m), ν(C═O)=1760 (s), ν(P═O)=1269 (s). LR-MS (ESI−) calcd for $[M+HCOO]^-$: 549.2; found: 549.2.

While the present invention has been described through illustrative embodiments, routine modification will be apparent to those skilled in the art and such modifications are intended to be within the scope of this disclosure.

What is claimed is:

1. A method for enhancing memory in a subject comprising administering to a subject in whom enhancement of memory is desired, a composition comprising a therapeutically effective amount of a compound having the following structure,

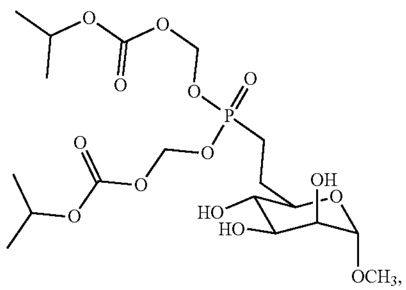

and/or a pharmaceutically acceptable salt thereof.

2. The method of claim 1, wherein memory enhancement is measured as retention of memory and/or duration of memory.

3. The method of claim 1, wherein the compound is administered in an amount in the range of 1 to 2,000 μg/kg body weight.

4. The method of claim 2, wherein the compound is administered in an amount in the range of 100 to 1,000 μg/kg body weight.

5. The method of claim 1, wherein the compound is the only agent in the composition that specifically binds to IGF-2 receptor.

6. The method of claim 1, wherein the subject has a memory impairment.

7. The method of claim 6, wherein the memory impairment is associated with a neurodegenerative disease or aging.

8. The method of claim 7, wherein the neurodegenerative disease is selected from the group consisting of Alzheimer's disease, Huntington's disease, Parkinson's disease, and amyotrophic lateral sclerosis (ALS).

9. The method of claim 6, wherein the memory impairment is associated with head injury, spinal cord injury, seizure, stroke, epilepsy, ischemia, neuropsychiatric syndromes, central nervous system (CNS) damage resulting from viral encephalitis, CNS damage resulting from meningitis, or CNS damage resulting from a tumor.

10. The method of claim 1, wherein the memory is short-term memory or long-term memory.

11. The method of claim 7, wherein the neurodegenerative disease is associated with protein aggregation and is chosen from Alzheimer's disease, Parkinson's disease, Huntington's disease, frontotemporal lobar degeneration, tauopathies, Amyotrophic Lateral sclerosis, and Lewy body disease.

12. The method of claim 1, wherein L2 is administered in an amount in the range of 1 to 2,000 μg/kg body weight.

13. The method of claim 12, wherein L2 is administered in an amount in the range of 1 to 500 μg/kg body weight.

14. The method of claim 1, wherein L2 is not conjugated to another moiety.

15. The method of claim 1, wherein L2 is the only agent in the composition that specifically binds to IGF-2 receptor.

* * * * *